United States Patent [19]
Uwira et al.

[11] Patent Number: 5,372,333
[45] Date of Patent: Dec. 13, 1994

[54] SEEKER HEAD ASSEMBLY IN A GUIDED MISSILE

[75] Inventors: Bernd Uwira, Konstanz; Uwe Hingst, Oberteurigen; Wolf-Dieter Paulus, Oberuhldingen, all of Germany

[73] Assignee: Bodenseewerk Geratetechnik GmbH, Uberlingen/Bodensee, Germany

[21] Appl. No.: 866,738

[22] Filed: Apr. 10, 1992

[30] Foreign Application Priority Data

Apr. 13, 1991 [DE] Germany ............... 4112140

[51] Int. Cl.⁵ .................... B64G 1/58; F41G 7/00
[52] U.S. Cl. ................... 244/3.16; 62/239; 102/293; 244/117 A; 244/158 A; 250/238
[58] Field of Search ............ 102/293, 213; 244/3.16, 244/117 A, 158 A; 250/238, 352; 62/239

[56] References Cited

U.S. PATENT DOCUMENTS

| | | | |
|---|---|---|---|
| 2,823,612 | 2/1958 | Cox et al. | 244/3.16 |
| 3,080,816 | 3/1963 | Levine | 244/117 A |
| 3,762,666 | 10/1973 | Thompson | 244/158 A |
| 3,974,985 | 8/1976 | Campbell et al. | 244/3.16 |
| 4,057,104 | 11/1977 | Altoz | 244/117 A |
| 4,235,398 | 11/1980 | Johnson | 244/117 A |
| 4,702,439 | 10/1987 | Kelley et al. | 244/158 |
| 4,717,822 | 1/1988 | Byren | 244/3.16 |

FOREIGN PATENT DOCUMENTS

| | | | |
|---|---|---|---|
| 2714688C2 | 6/1986 | Germany . | |
| 3836783 | 5/1990 | Germany | 244/3.16 |

*Primary Examiner*—Harold J. Tudor
*Attorney, Agent, or Firm*—Dougherty, Hessin, Beavers & Gilbert

[57] ABSTRACT

In a seeker head assembly in a guided missile, particularly a high-speed guided missile, the seeker head (22) is covered by a dome (28) which is rotatably mounted in the structure and is rotated. The dome (28) is circumferentially surrounded by the structure (10) of the guided missile except for a window section (14). A coolant is supplied to an interspace (46) formed between dome (28) and structure (10) of the guided missile.

24 Claims, 9 Drawing Sheets

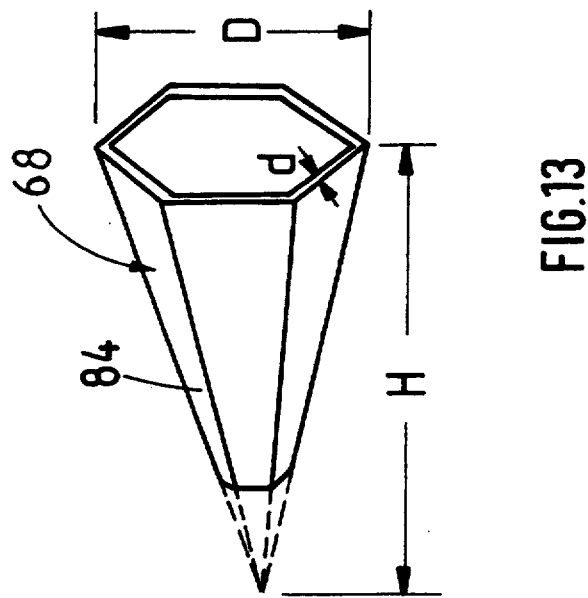
FIG.13
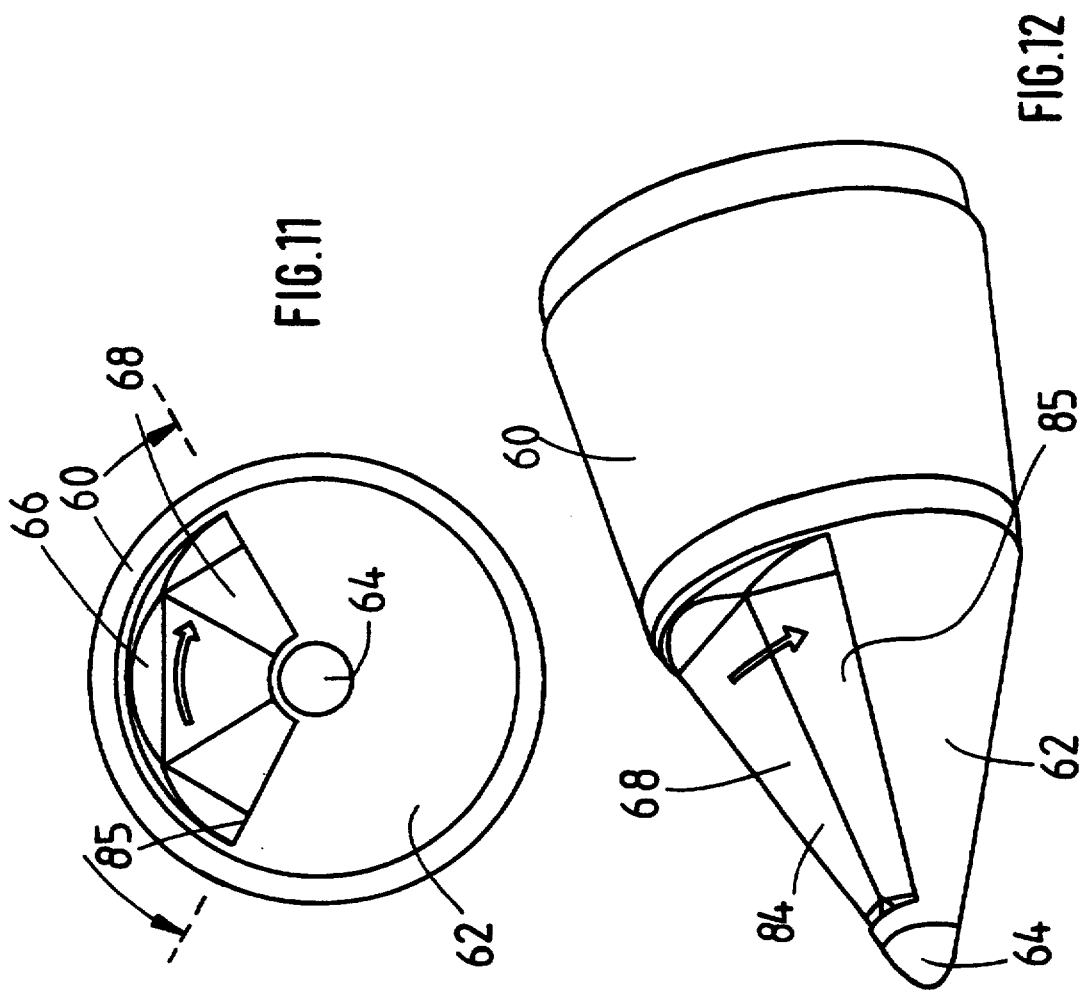
FIG.11
FIG.12

SEEKER HEAD ASSEMBLY IN A GUIDED MISSILE

The invention relates to a seeker head assembly in a guided missile, particularly a high-speed guided missile.

High-velocity guided missiles operating in the velocity range over 3 Mach are required for applications which requires extremely short reaction times. Such high-velocity missiles are particularly required for fighting very fast targets, such as ballistic rockets, or highly maneuverable targets. In such high-velocity guided missiles preferably IR-seekers are used, i.e. infrared seekers wherein the field of view is imaged. Such seekers are particularly well suited for these tasks because of the picture processing possible therein and the precision in the final stage steering.

However, problems arise with such high-velocity guided missiles.

Due to the high velocity, the high-velocity guided missile is strongly heated-up aerodynamically. In particular, also the dome is heated-up, i.e. the radiation-transparent cover of the seeker head, which usually forms the tip of the high-velocity guided missile. Due to this aerodynamical heating-up of the dome, very high temperatures arise within a few seconds. Such temperatures can result in destruction of the dome. Also the mechanical stress is very high and can result in rupture of the dome.

Due to the heating-up, the dome itself emits infrared radiation. This emission of the dome also in direction toward the seeker head results in signal losses and increased noise. The transmission of the dome is decreased at the high temperatures. The dome is subjected to very strong erosion when the high-velocity guided missile flies through (rain erosion).

Various attempts have been made to solve these problems. Instead of the dome, infrared-transparent windows located laterally and having very small angle of attack of approximately 20° have been provided. In many applications, such windows will resist the mechanical stress. However, at velocities over 3 Mach also with such a design no resistance against rain erosion can be achieved. In particular, the coating on the outer side of the window chips-off from the substrate forming the window. However, due to the small angle of incidence of the light, the window cannot be used without coating.

It has been tried to cool down such a window on the outside with a liquid coolant. However, such a liquid coolant on the outside of the window causes stong optical disturbances. Therefore, also this method is unsuitable. Furthermore, a large quantity of coolant is consumed due to the strong aerodynamical flow.

Furthermore, it has been tried to provide the window with passages, through which a coolant is passed. This is very expensive. Furthermore, unacceptable optical losses occur particularly in boresight-direction.

It is the object of the invention to provide a seeker head assembly for guided missiles which provides protection of the seeker head and is resistant to the loads occuring at high velocities.

According to the invention this object is achieved with a seeker head assembly of the above mentioned type by (a) a dome covering the seeker head and rotatably mounted in the structure of the missile, and
(b) means for rotating the dome,
(c) the dome being circumferentially surrounded by the structure of the guided missile except for a lateral window section.

Thus, according to the invention, the dome is covered by the structure of the guided missile with the exception of a window section. The dome is rotatably mounted and rotated. Therefore, each portion of the dome is subjected to the aerodynamical load only during part of the time of flight of the high-velocity guided missile. During most of the time of flight, each section of the dome is covered and protected by the structure. Thus, the duration of the thermal load on each portion of the dome is correspondingly reduced.

Advantageously, a coolant is supplied to an interspace formed between the dome and structure of the guided missile. Then, the portions of the dome which are not located in the window section are cooled down by the coolant. Thereby, the temperature of the dome can be considerably reduced. The portions located in the window section are not exposed to any coolant. Thus, the transmission of the dome in this area is not reduced by the coolant. The coolant is not subjected to the strong aerodynamical flow which occurs at the surface of the guided missile.

The interspace can be formed simply by providing a dome which is axially symmetrical to an axis parallel to the longitudinal axis of the guided missile but laterally offset thereto, the dome being rotatable about this axis, whereby an interspace having a crescent-shaped cross section is formed between the structure of the guided missile and the dome.

Advantageously, the dome forms a pyramid having a plurality of side faces, the side faces being formed by plane-parallel facets. This offers the advantage that the dome does not influence the imaging of the field of view by an optical system of the seeker head. Each facet is a plane-parallel plate which is passed through by parallel light beams, when the object is located virtually at infinity.

The structure of the guided missile can have a heat-insulating layer which thermally insulates the interspace against an outer skin of the guided missile. Thereby, the consumption of coolant can be reduced.

An advantageous construction consists in that the structure of the guided missile forms a tip and the dome is rotatably mounted, on one hand, with its closed end in the tip and, on the other hand, with its edge in the structure of the guided missile. Coolant outlets ending in the interspace can be formed in the tip.

A particularly advantageous embodiment of the invention uses an evaporation cooler for cooling down the dome.

An embodiment of the invention will now be described in greater detail with reference to the accompanying drawings.

FIG. 11 is a front view of the missile.

FIG. 12 is a perspective illustration of the tip of the missile.

FIG. 13 is a perspective illustration of the facets of the dome having hexagonal cross section in a seeker head assembly of FIGS. 11 and 12.

Figure 1:
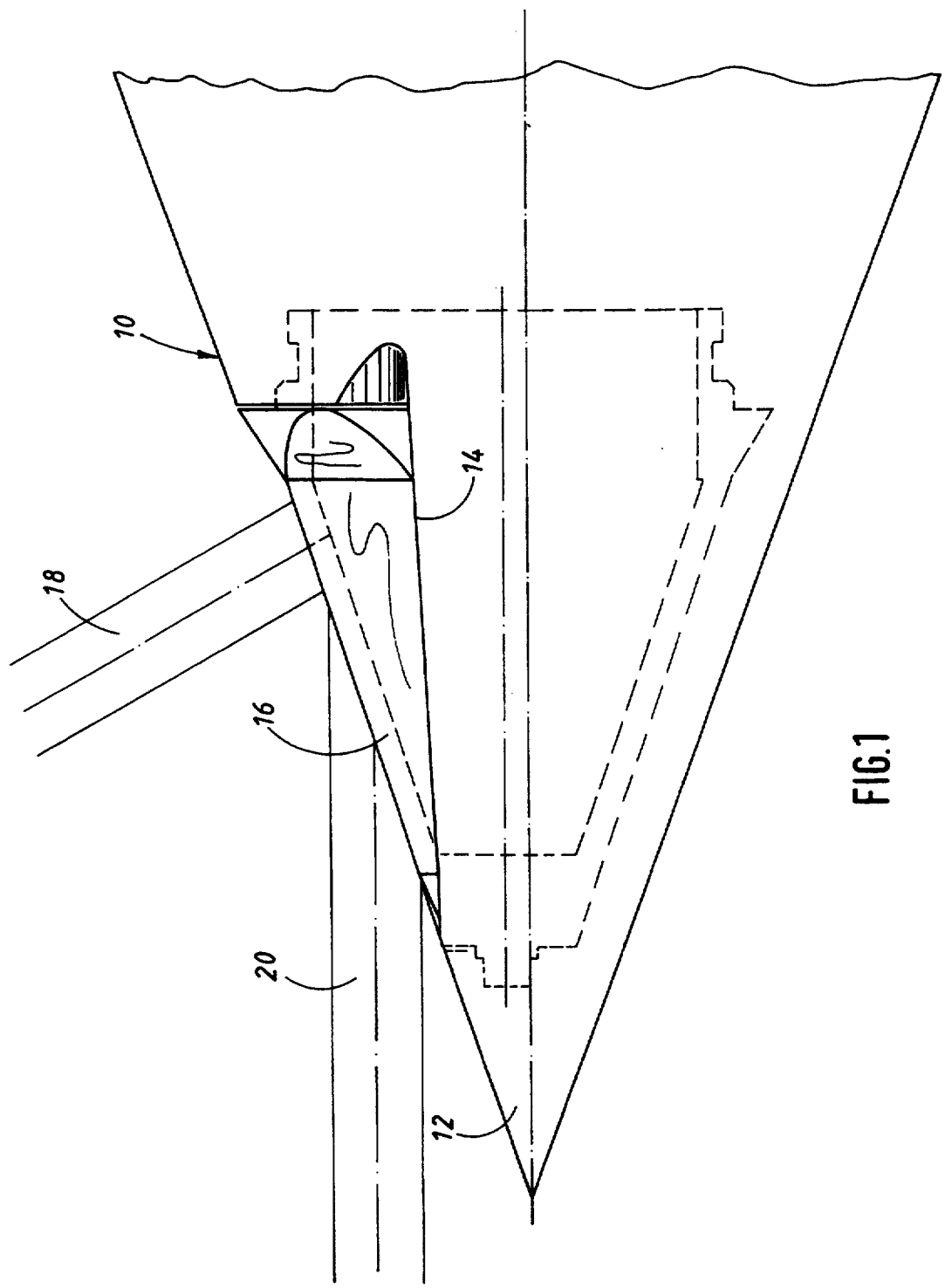
FIG. 1 shows a side view of the front portion of a high-velocity guided missile having a seeker head assembly.

In FIG. 1 numeral 10 designates the structure in the front portion of a high-velocity guided missile. The high-velocity guided missile flies at a velocity of more than three Mach. The front portion is substantially conical having a conical tip 12. The structure 10 in the front portion of the high-velocity guided missile has a lateral window section 14. In a way still to be described, the window section 14 is closed by a rotating dome 16, which is transparent to infrared radiation. Through the window section 14 and the dome 16 a seeker head scans a field of view substantially located at infinity, as indicated by the parallel light beams 18 and 20.

Figure 2:
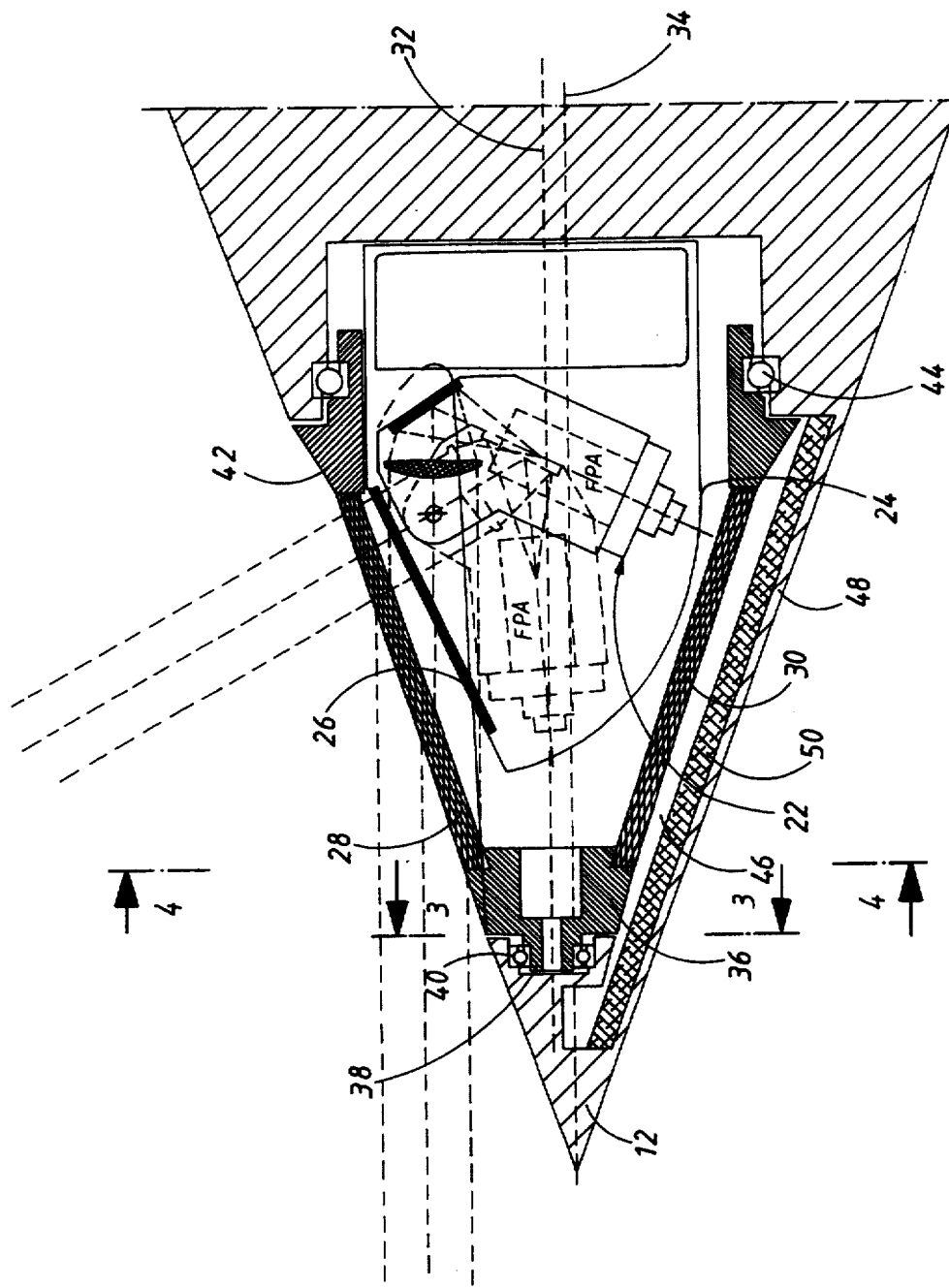
FIG. 2 shows a longitudinal section through the front portion of the high-velocity guided missile.

As seen in FIG. 2, the seeker head which is generally designated by numeral 22 is located in the front portion of the high-velocity guided missile. The seeker head 22 is an imaging infrared seeker head and causes scanning of the field of view by means of an optical system and a multielement detector. The construction of such a seeker head is known per se and is not subject matter of the present invention. Therefore, the seeker head 22 is not described in detail here. The seeker head 22 is located in a hermetically sealed housing 24. The housing is hermetically closed by a lateral window 26 transparent to infrared radiation. The window 26 is located in the area of the window section 14 (FIG. 1).

Figure 4:
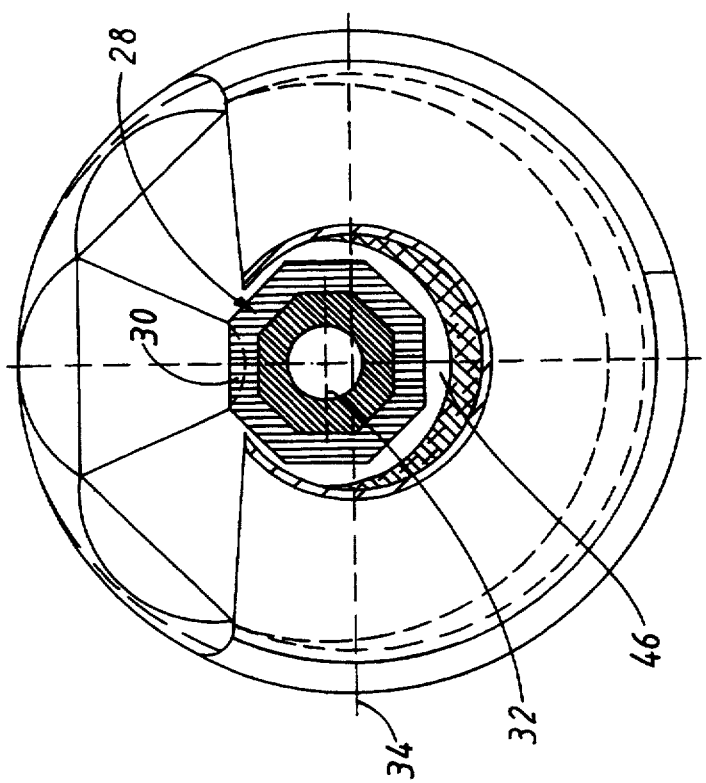
FIG. 4 shows a section taken along the line 4—4 in FIG. 2 as viewed from the left in FIG. 2.

The seeker head 22 with the housing 24 and the window 26 is laterally covered by a dome 28. The dome 28 likewise consists of infrared-transparent material. The dome 28 has the general shape of a pyramid having a plurality of side faces. In the illustrated embodiment, the pyramid has regularly octagonal cross section, as best seen in FIG. 4. The individual facets of the pyramid are formed by plane-parallel plates 30. The axis 32 of the dome 28 is parallel but laterally offset to the longitudinal axis 34 of the high-velocity guided missile. The plates are transparent to infrared radiation. The dome is rotatably mounted about its axis 32 in the structure 10 of the high-velocity guided missile. The plates forming the facets of the pyramid are supported at the front end in a head portion 36. The head portion 36 has a pin 38 which is coaxial with the axis 32. The pin 38 is rotatably mounted in the tip 12 of the structure 10 through a ball bearing 40. The plates 30 are connected to a ring 42 at the wide rear end of the pyramid. The ring 42 is likewise coaxial with the axis 32. The ring 42 is mounted in the structure 10 through a ball bearing 44. The dome 28 extends over the housing 24 of the seeker head 22 and over the window 26. Thereby, the dome also covers the window section 14. However, there is no sealing between the dome 28 and the structure 10 at the edges of the window section 14. Rather, the dome 28 remains freely rotatable. The dome 28 is rotated about the axis 32 by a driving mechanism (not shown).

Due to the eccentric arrangement of the axis 32 in the structure 10, an interspace 46 having a crescent-shaped cross section is formed between outer surface of the dome 28 and the structure 10. The interspace 46 is separated from the outer skin 48 of the structure 10 by a layer 50 of heat-insulating material.

Figure 3:
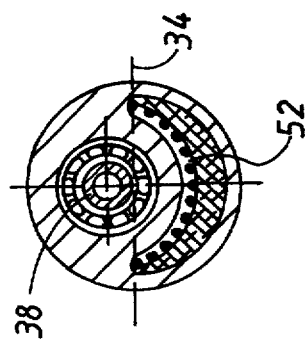
FIG. 3 shows a section taken along the line 3—3 in FIG. 2 as viewed from the right in FIG. 2.

As can be seen best from FIG. 3, a coolant is supplied to the interspace 46 from the tip 12 through coolant outlets 52. Liquid nitrogen can serve as coolant which evaporates and then emerges into the atmosphere through a slot defined between the rotating dome 28 and the edges of the window section 14.

During the rotation of the dome 28, each facet of the pyramid of the dome 28 is subjected to the aerodynamical load and heated through the window section 14 during approximately 20 percent to 25 percent of the time. During the remaining 80 percent or 75 percent, respectively, of the time, each facet is covered by the structure and is cooled down by the coolant. If it is assumed that each facet is allowed to be subjected to the aerodynamical load for a maximum of one second, then an available cooling time of approximately 3 to 4 seconds per rotation of the dome 28 results. It has been found that coated ZnS-windows which are transparent in the wavelength range of 8 to 12 $\mu$m, are allowed to be heated-up to approximately 700K. within one second without damages occuring. Using liquid nitrogen as coolant, the temperature of the facets can be reduced to approximately 300K. within a time of less than 4 seconds. If the facet, during each rotation is subjected to the aerodynamical load for one second in the area of the window section, then a mean temperature gradient, i.e. heating per second, of the exposed facets of 400K./s can be managed with the described arrangement.

Calculations with similar configurations result in temperature gradients of approximately 100K./s at Mach 4 near ground. 300K./s has resulted for comparable configurations at an altitude of 15 km at Mach 6. Such temperature gradients, i.e. heating-up rates, can be well managed with the described solution. With still higher temperature gradients, the penetration depth of the aerodynamically heated-up layer into the IR-dome is smaller. Then, the cooling-down by the coolant can be effected correspondingly more quickly. Thus, the rotation rate of the IR-facet dome can be increased.

Figure 5:
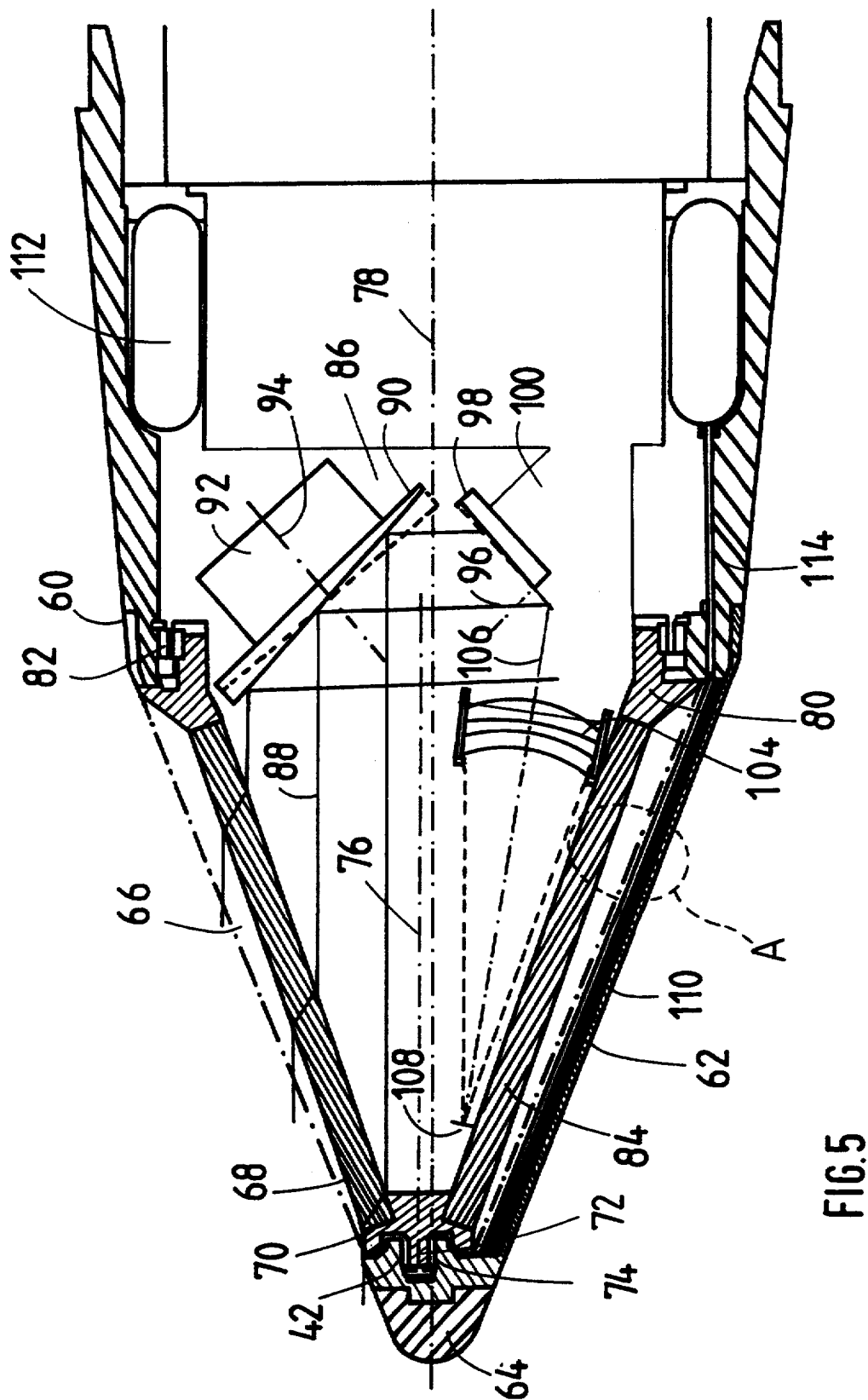
FIG. 5 shows a longitudinal section similar to FIG. 2 through the front portion of another preferred embodiment of a high-velocity guided missile.

A further preferred embodiment of the invention is illustrated in FIGS. 5 and 11–13 similar to FIG. 2. In FIG. 5, numeral 60 generally designates the airframe or structure of a missile. Similar to FIGS. 1 and 2, the structure 60 forms a conical tip 62 having a stagnation point nose 64. A window opening 66 is formed in the peripheral surface of the tip 62. A rotatable infrared-transparent dome 68 is located in the tip 62. The dome 68 has a head portion 70. A pin 72 of the head portion 70 is rotatably mounted in the stagnation point nose 64 through a bearing 74. The axis of rotation 76 of the head portion 70 is parallel to the longitudinal axis 78 of the missile, but is laterally slightly offset thereto. Furthermore, the dome 68 has a ring 80. The ring 80 is rotatably mounted in the airframe or structure of the missile about the axis of rotation 76 through a bearing 82 at the wide end of the tip 62. Facets 84 of the pyramid-shaped dome 68 extend between the head portion 70 and the ring 80. As in the embodiment of FIGS. 1 and 2, the facets are plane-parallel plates. Thus, they do not affect the image of the field of view on the detector of the seeker. Slots 85 are formed between the longitudinally extending edges of the window section 66 and the rotating dome 68 as seen in FIGS. 11 and 12.

In FIG. 5 the seeker head is generally designated by 86. The path of rays of the seeker head 86 comprises a parallel light beam 88 which enters parallel to the longitudinal axis 78 of the missile through the window section 66 and through the infrared-transparent dome 68. The light beam 88 impinges upon a first wobbling mirror 90 which is driven by a motor 92 about an axis 94. The reflected light beam 96 impinges upon a second wobbling mirror 98 which is driven by a motor 100 about an axis 102. Through an objective 104 the deflected light beam 106 is focused on a detector 108. Through the two wobbling mirrors 90 and 98 the field of view is scanned in known way along a rosette-path. From the signals from the detector 108 and the associated angular positions of the wobbling mirrors 90 and 98 rotating at different rotary speeds, a representation of the field of view in the form of a pixel matrix is generated which can be processed in suitable manner. This is known technique and therefore need not be described in detail here.

The dome 68 is driven about the axis 76. Therefore, the different facets 84 of the dome 68 appear consecutively in the window section 66 for a limited time. Only during this limited time, they are subjected to the flow of air and the aerokinetic heating-up. During the rest of the time each facet is covered by the structure 60. During this time, each facet is cooled down by an evaporation cooler 110 located in the conical tip 110. The coolant of the evaporation cooler 110 is contained in a tank 112. The tank 112 is toroidal having oblong cross section. The tank 112 is coaxial with the longitudinal axis 78 of the missile within the skin of the structure 60. Thus, the tank 112 supports the stability of the structure 60 of the missile. The tank 112 communicates with the evaporation cooler 110 through a conduit 114. The evaporation cooler 110 is located in the space of crescent-shaped cross section formed between the structure 60 and the dome 68 arranged eccentrically thereto.

Figure 6:
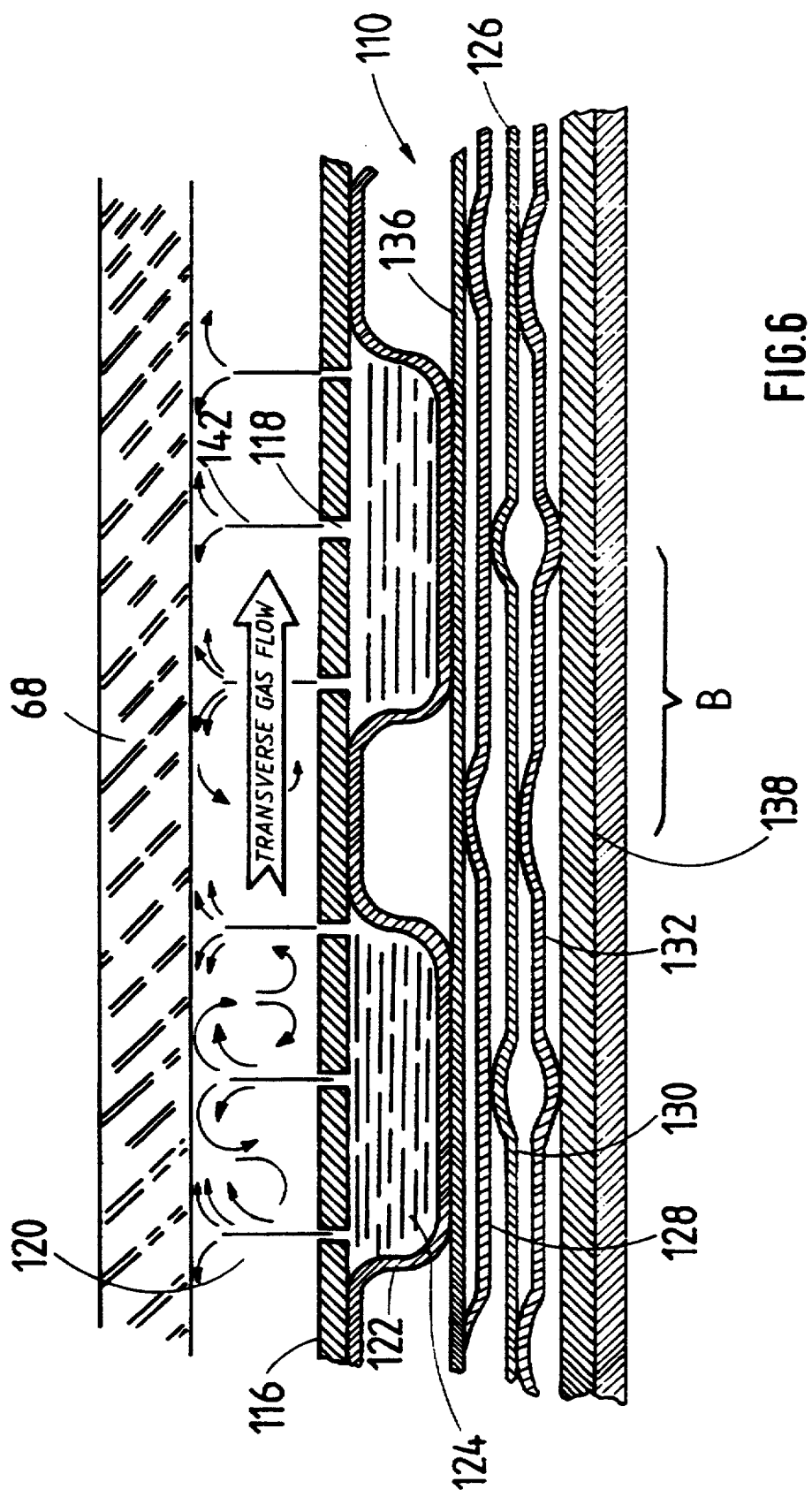
FIG. 6 shows, at an enlarged scale, a detail "A" of FIG. 5, i.e. the construction of the evaporation cooler.
Figure 7:
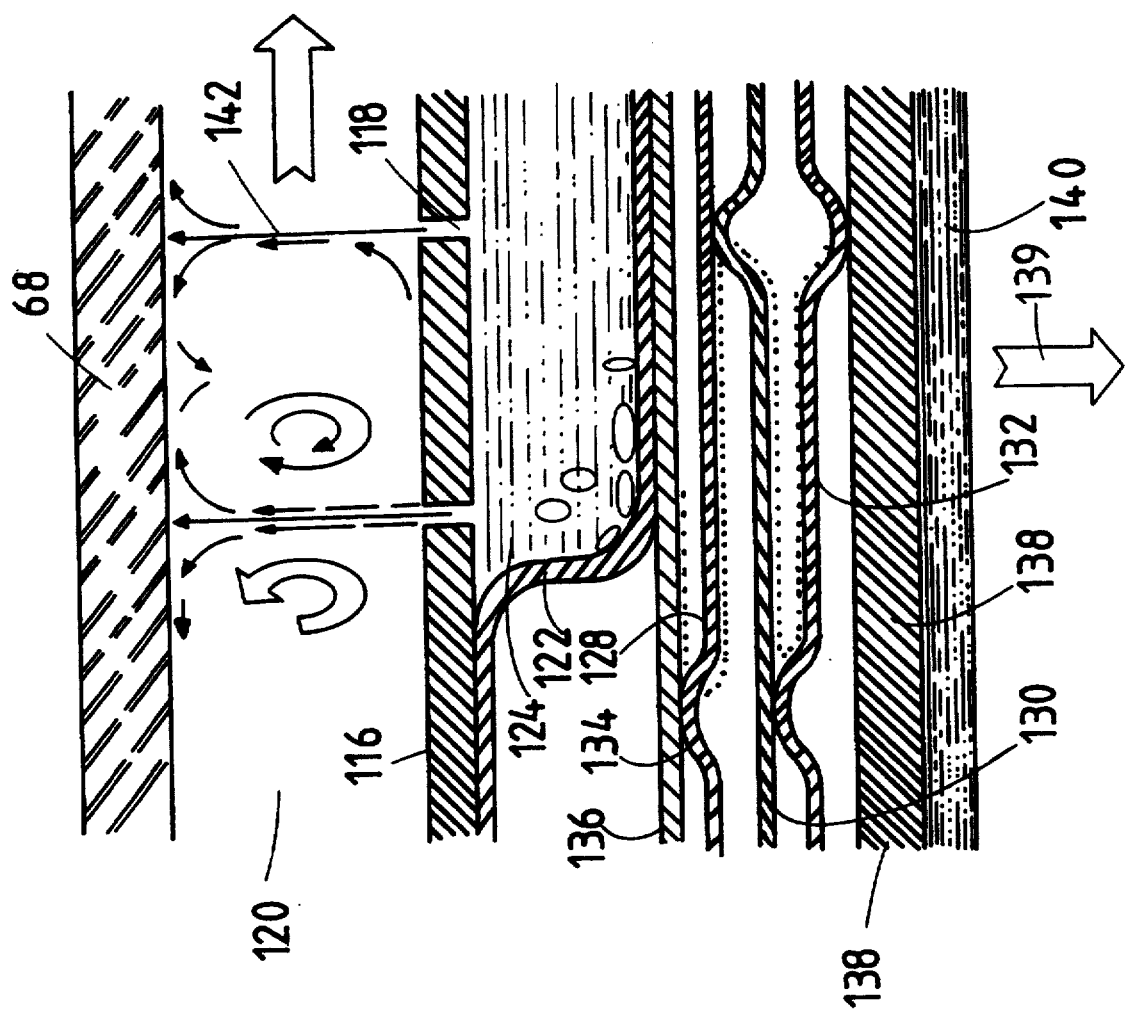
FIG. 7 shows, at an enlarged scale, a detail "B" of FIG. 6, i.e. the heat path between evaporation cooler and structure of the missile.

As can be seen from FIG. 6, which is a detail of portion "A" of FIG. 5, the evaporation cooler 110 comprises a perforated plate 116. The perforated plate 116 has a plurality of nozzle openings or holes 118. The perforated plate 116 extends around the dome 68 in the area covered by the tip 62. The perforated plate 116 is spaced from the peripheral surface of the dome 68 such that an interspace 120 is formed between perforated plate 116 and dome 68. A sheet metal element 122 is welded onto the outer surface of the perforated plate 116 remote from the dome 68. The skeet metal element 122 is formed such that a meander-shaped coolant passage 124 is formed. The coolant passage 124 communicates with the nozzle openings 118. The sheet metal element 122 is supported on a sheet 136 of a layer 126 which limits the heat transmission from the skin of the tip 62 to the coolant passages 124 of the evaporation cooler 110. In the embodiment of FIGS. 5 to 7 this layer 126 consists of a plurality of substantially parallel metal sheets 128, 130, 132. These metal sheets 128, 130 and 132 are provided with corrugations 134 and welded to each other at mutually offset locations or to a sheet metal 136 welded onto the sheet metal 122 or the skin 138 of the tip 62, respectively. As can be seen best from FIG. 7, the heat transmission is then effected by conduction along a relatively long path extending in the metal sheets 132, 130 128 and 136. This path is indicated by a dotted line in FIG. 7. A further heat transmission is effected by radiation as indicated by arrow 139 in FIG. 7. This radiation can be reduced in that the metal sheets 128 to 136 are provided with a reflecting surface of low degree of absorption and emission. Furthermore, the skin 138 of the tip 62 is provided with a heat protection layer 140 on the outside.

It is true that the described layer 126 limits the heat flow from the hot structure 60 to the evaporation cooler 110. However, a certain selected heat flow is permitted. This offers the advantage that also the structure is cooled down and is kept at an admissible though high temperature.

As can be seen from FIGS. 6 and 7, the coolant emerges through each of the nozzles 118 as jet 142 and impacts upon the outside of the dome 68. The emerging coolant is evaporated by the hot surface of the dome 68. The evaporation heat cools down the surface of the dome 68. The formed vapor of the coolant flows in the interspace 120. By the impact of the jet 142 substantially perpendicular to the surface of the dome 68 and by the transversally extending gas flow, heavy turbulence of the coolant is effected. Thus, the heat transmission from the dome 68 to the coolant is effected substantially uniformly over the total surface of the dome 68. This results in a good heat transmission coefficent. The turbulence also prevents formation of a heat-insulating steam film in the interspace 120.

The coolant vapor flows through the interspace 120 and emerges through the slots (see FIGS. 11 and 12) 85 which are formed between the edges of the window section 66 and the dome 68. Through this emerging gas a protecting gas buffer is formed like with the boundary layer blowing-out. This gas buffer ensures that turbulences which aerodynamically cannot be avoided, do not result in unduly high additional heating-up in this area.

A fluid of high enthalpy of vaporization is preferably used as coolant. Water or ammonia ($NH_3$) have been proven to be advantageous. These substances have relatively high specific enthalpies of vaporization. The vaporization temperatures at atmospheric pressure have favorable values relative to the ambient temperatures. The enthalpy of vaporization is $$r_{S,H2O} = 2\,257 \text{ kJ/kg}$$

for water and $$r_{S,NH} = 1\,369 \text{ kJ/kg}$$

for ammonia. The vaporization temperatures are 100° C. for water and −33° C. for ammonia.

The nozzles or holes 118 in the perforated plate 116 are non-uniformly distributed over the surface of the perforated plate 116 such that the temperature gradient in space due to the cooling-down in the dome 68 is minimized. The dimensions of the holes 118 may also be non-uniform.

Figures 8, 9:
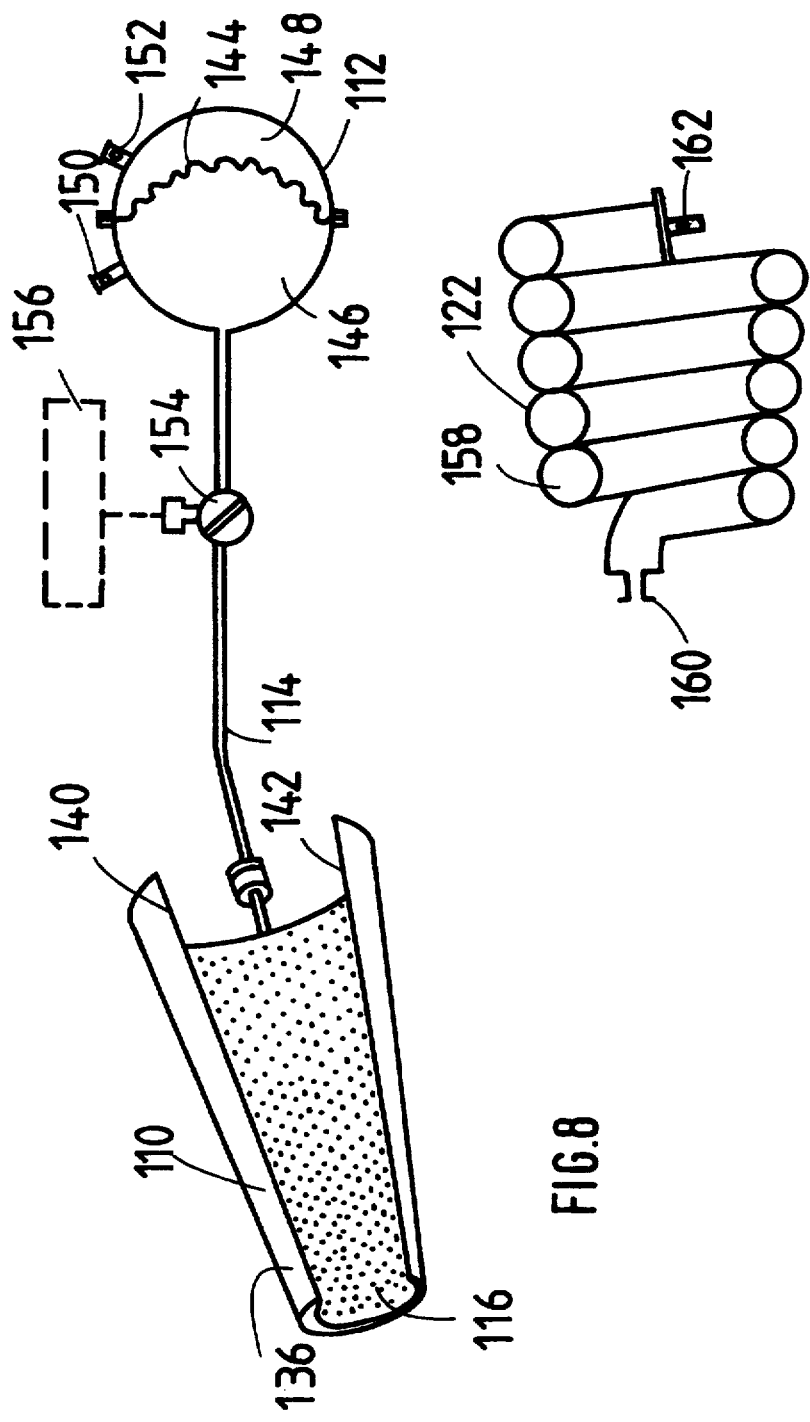
FIG. 8 is a schematical illustration of the evaporation cooler with the perforated plate.
FIG. 9 shows another embodiment of a tank for the coolant.

FIG. 8 schematically shows the construction of the evaporation cooler 110.

On the inside, the evaporation cooler 110 comprises the perforated plate 116 and, on the outside, the sheet metal 136. Perforated plate 116 and sheet metal 136 are interconnected along their longitudinal edges 140 and 142. The coolant passage 124 (not visible in FIG. 8) communicates with the tank 112 through conduit 114. The tank 112 is divided into two chambers 146 and 148 by a flexible diaphragm 144. Water is filled in as coolant through a socket 150, into the chamber 146 connected to the conduit 114. A pressurized gas, such as compressed air, is filled through a socket 152 into the other chamber 148. The pressurized gas is maintained at high pressure. Then, also the water at correspondingly high pressure. An electromagentically controlled valve 154 is arranged in the conduit 114. The valve 154 is controlled by electronics 156. Through the valve 154 the water is supplied under high pressure into the coolant passage 124. Through the valve 154 the pressure of the water in the coolant passage 124 can be controlled and, thus, the cooling power of the evaporation cooler 110 can be controlled as a function of time. It can, for example, be taken into account that the heating-up of the dome 68 in the initial flight phase is stronger than in the final flight phase.

FIG. 9 shows a modified form of the tank 122. In this embodiment, the tank 122 is a coiled tube 158 which is provided with a port 160 for the conduit 114 at its left end in FIG. 9. At its right end in FIG. 9 ammonia is filled in through a filling socket 162. The ammonia is at its own vapor pressure. That is approximately 10 Mpa at 25° C.

Figure 10:
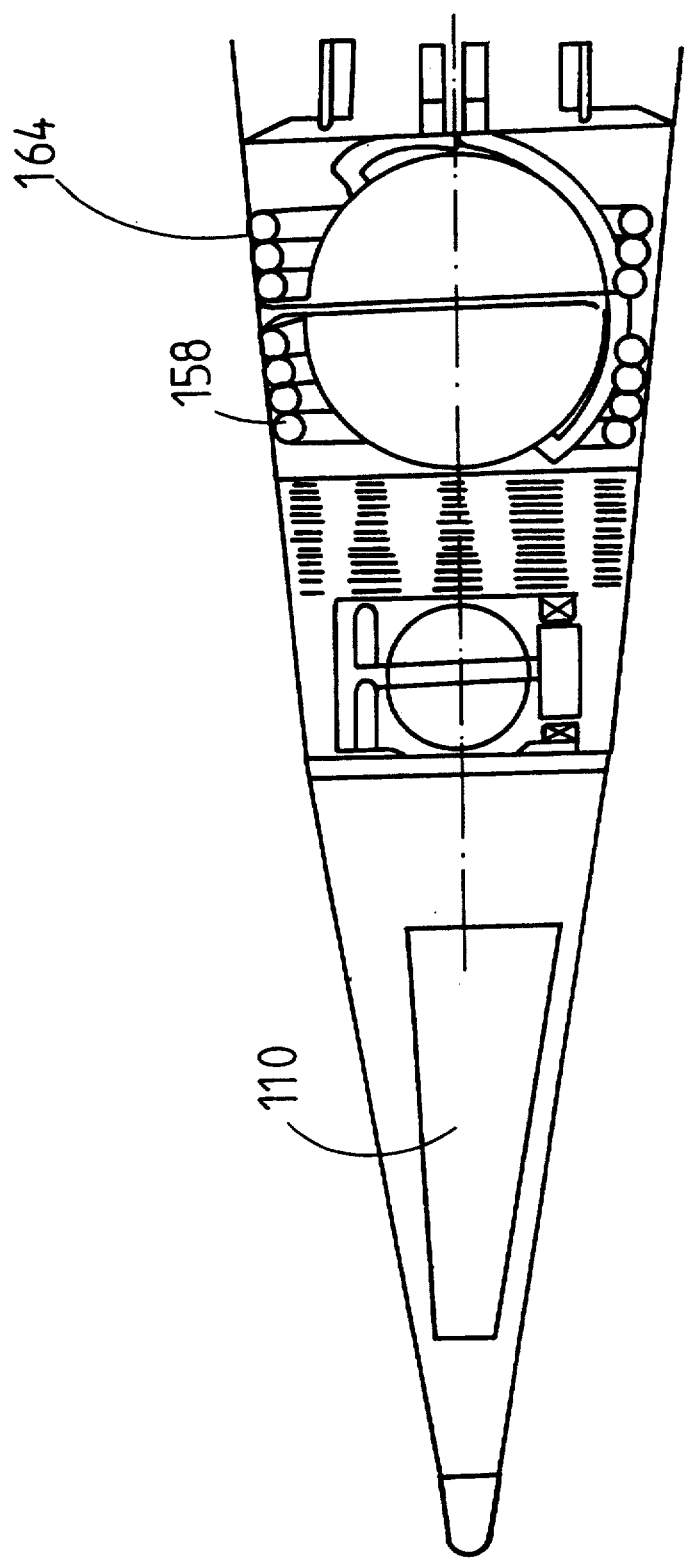
FIG. 10 shows the arrangement of the tank of FIG. 9 in a missile.

As can be seen from FIG. 10, the coiled tube 158 is arranged within the outer skin 164 of the missile and adapted to its shape. Thereby, also here the tank 112 increases the stability of the structure 60.

We claim:

1. A seeker head assembly in a guided missile, wherein the guided missile has an elongated structure defining a longitudinal axis and forming a tapering shell at its front end, the tapering shell defining an aperture lateral with respect to the longitudinal axis, said assembly comprising:
   a seeker head mounted within the tapering shell and adapted for responding to an electromagnetic radiation;
   a dome which surrounds said seeker head and is positioned within said tapering shell and inside said lateral aperture, said dome tapering toward a front end thereof and being open toward a rear portion of the missile, and said dome being transparent to said electromagnetic radiation and a path of rays of said seeker head extending through said dome and said lateral aperture; and
   means for rotatable mounting said dome within said tapering shell about an axis substantially parallel to said longitudinal axis.

2. A seeker head assembly as claimed in claim 1, wherein the seeker head is located in a housing which is hermetically closed by a window adjacent to said lateral aperture.

3. A seeker head assembly as claimed in claim 1, wherein an interspace is formed between said dome and said tapering shell, and further comprising means for supplying a coolant into said interspace.

4. A seeker head assembly as claimed in claim 3, wherein said interspace has a crescent-shaped cross section.

5. A seeker head assembly as claimed in claim 1, wherein the dome has the shape of a pyramid having a plurality of side faces and is formed by plane-parallel facets.

6. A seeker head assembly as claimed in claim 3, further comprising a heat-insulating layer which thermally insulates said interspace from an outer skin of the guided missile.

7. A seeker head assembly as claimed in claim 1, wherein said structure of the guided missile forms a tip and said front end of said dome is rotatable mounted in the tip.

8. A seeker head assembly as claimed in claim 3, further comprising coolant outlets ending in said interspace.

9. A seeker head assembly as claimed in claim 3, and further comprising an evaporation cooler having a perforated plate, which extends around the dome, is arranged to introduce coolant liquid into said interspace between said dome and said tapering shell and means for spraying coolant under pressure through holes of said perforated plate against said dome.

10. A seeker head assembly as claimed in claim 9, wherein a portion of said interspace is formed between said perforated plate and said dome.

11. A seeker head assembly as claimed in claim 9, wherein the coolant is a fluid of high enthalpy of vaporization.

12. A seeker head assembly as claimed in claim 11, wherein the coolant has an evaporation temperature close to ambient temperature.

13. A seeker head assembly as claimed in claim 12, wherein the coolant is water.

14. A seeker head assembly as claimed in claim 12, wherein the coolant is ammonia ($NH_3$).

15. A seeker head assembly as claimed in claims 9, wherein a sheet metal element is welded onto the surface of said perforated plate remote from the dome, said sheet metal element forming a meander-shaped passage for the coolant which communicates with said holes of said perforated plate.

16. A seeker head assembly as claimed in claim 6, wherein said heat-insulating layer comprises a plurality of metal sheets provided with corrugations, said metal sheets engaging each other and being interconnected at mutually offset locations.

17. A seeker head assembly as claimed in claims 9, and further comprising a tank means for accommodating coolant liquid, said tank being divided into two chambers by a diaphragm, one of the chambers containing the coolant liquid and the other chamber containing a pressurized gas.

18. A seeker head assembly as claimed in claim 9, and further comprising a tank in the form of a coiled tube for accommodating said coolant.

19. A seeker head assembly as claimed in claim 9, wherein said perforated plate and means for storing the coolant and supplying the coolant to the perforated plate are integrated in the structure such that they contribute to the stability of the structure.

20. A seeker head assembly as claimed in claim 19, wherein a tank for the coolant is toroidal and coaxial with said longitudinal axis of the missile and is arranged closely within an outer skin of the missile.

21. A seeker head assembly as claimed in claim 9, wherein the evaporation cooler is in throttled heat exchange with a missile skin surrounding the seeker head such that also the missile skin in the area of the seeker head is cooled down to a permissible temperature.

22. A seeker head assembly as claimed in claim 9, wherein the distribution of said holes in said perforated plate is non-uniform over the surface of the perforated plate such that the temperature gradient in the material of the dome is substantially minimized.

23. A seeker head assembly as claimed in claim 9, wherein the evaporated coolant emerges out of the interspace through longitudinal slots between said dome and said structure at the edge of the window section.

24. A seeker head assembly as claimed in claim 9, wherein the dimensions of said holes in said perforated plate are non-uniform over the surface of the perforated plate such that the temperature gradient in the material of the dome is substantially minimized.

* * * * *